US006938662B2

(12) United States Patent
Jung

(10) Patent No.: US 6,938,662 B2
(45) Date of Patent: Sep. 6, 2005

(54) BONDING MACHINE FOR LAMELLAR PIECES OF WOOD TO BE JOINED TO A BOARD AND METHOD FOR PRESSING LAMELLAR PIECES OF WOOD TO BOARDS

(75) Inventor: Erhard Jung, Altenstadt (DE)

(73) Assignee: GreCon Dimter Holzoptimierung Süd GmbH & Co. KG, Illertissen (DE)

( * ) Notice: Subject to any disclaimer, the term of this patent is extended or adjusted under 35 U.S.C. 154(b) by 150 days.

(21) Appl. No.: 09/858,150

(22) Filed: May 14, 2001

(65) Prior Publication Data

US 2002/0026988 A1 Mar. 7, 2002

(30) Foreign Application Priority Data

May 24, 2000 (DE) ........................................ 100 25 383

(51) Int. Cl.$^{7}$ ........................ B23K 37/04; B30B 15/10; B32B 35/00

(52) U.S. Cl. .................... 156/580; 156/583.1; 100/302; 100/315; 100/326; 100/233; 100/237; 100/296

(58) Field of Search .......................... 156/380.2, 380.4, 156/380.6, 391, 556, 583.1, 580, 308.2, 308.4, 308.6; 100/2, 3, 38, 42, 302, 315, 316–318, 324–326, 208, 209, 219, 228, 232, 233, 237, 238, 257, 269.2, 295, 214, 221, 226, 227–229 R, 258 A, 269.01, 269.06, 296, 258, 269.05, 308

(56) References Cited

U.S. PATENT DOCUMENTS

| | | | | | |
|---|---|---|---|---|---|
| 2,593,691 | A | * | 4/1952 | Onsrud | 156/351 |
| 2,830,631 | A | * | 4/1958 | Cranston, Jr. et al. | 100/45 |
| 4,289,467 | A | * | 9/1981 | Pesch | 425/141 |

* cited by examiner

*Primary Examiner*—Chris Fiorilla
*Assistant Examiner*—Sing Po Chan
(74) *Attorney, Agent, or Firm*—Gudrun E. Huckett

(57) ABSTRACT

A bonding machine for lamellar pieces of wood to be joined to a board has at least one clamping and pressing device and at least one drive. The clamping and pressing device has at least two pressing members which are configured to be loaded independently of one another against the board by a pressure force. The pressing members extend parallel to the pieces of wood and transversely to a feeding direction of the board. The drive has piston-cylinder units configured to adjust the pressing members.

48 Claims, 7 Drawing Sheets

BONDING MACHINE FOR LAMELLAR PIECES OF WOOD TO BE JOINED TO A BOARD AND METHOD FOR PRESSING LAMELLAR PIECES OF WOOD TO BOARDS

BACKGROUND OF THE INVENTION

1. Field of the Invention

The invention relates to a bonding machine for lamellar pieces of wood to be joined to a board as well as a method for pressing lamellar pieces of wood to boards.

2. Description of the Prior Art

Such bonding machines serve to manufacture boards from individual elongate pieces of wood. For this purpose, the pieces of wood are coated on a longitudinal side with an adhesive and are placed against one another with these longitudinal sides. In this way, boards of different length can be produced from the pieces of wood. The pieces of wood resting against one another and bonded at the longitudinal sides are pressed in the pressing device.

SUMMARY OF THE INVENTION

It is an object of the invention to configure the bonding machine of the aforementioned kind and the method of the aforementioned kind such that an optimal pressing of the pieces of wood in the pressing device is ensured.

This object is solved according to the invention for the bonding machine of the aforementioned kind in that the clamping device has at least two pressing members which can be loaded independently of one another against the board by a pressure force and for the method of the aforementioned kind according to the invention in that the pressing power is exerted against a brake pressure exerted transversely thereto onto the board.

In the bonding machine according to the invention the pressing members can be loaded independent of one another by a pressing force. Accordingly, the pressing force can be optimally applied onto the pieces of wood, in particular, when they have thickness tolerances. By means of the bonding machine, it is possible to carry out bonding of a board, for example, or bonding of strips for center layers of, for example, door jambs. The pieces of wood can be deciduous and/or coniferous wood material. For pressing, a pressing power is applied according to the invention transversely to a force of pressure, which acts as a brake power, onto the board.

When the clamping device according to the invention has heating elements, relative to which the pressing members can be moved to a limited extent transverse to the board, the pressing or brake force can be applied onto the board in a reliable way even for thickness tolerances of the pieces of wood.

According to the invention, the clamping device has arranged upstream thereof at least one pressing slide with which the pressing power is applied onto the pieces of wood of the board. By doing so, the individual pieces of wood are optimally tightly pressed against one another with their adhesive-coated longitudinal sides. Accordingly, in cooperation with the brake force acting onto the pieces of wood in the vertical direction, an excellent bonding of the pieces of wood is achieved.

According to the invention the support of the pressing device for the pieces of wood can be comprised of at least two support parts.

When the pressing members at the end of the adjacently positioned pieces of wood project past them, it is provided according to the invention to introduce compensation elements into the pressing device so that the projecting areas of the pressing members are also supported. By doing so, a moment of tilt of the pressing members occurring during the pressing action is prevented which moment, without the compensation element, would result in an impairment of the pressing action of the pieces of wood at the edge area.

Further features of the invention result from the further claims, the description, and the drawings.

BRIEF DESCRIPTION OF THE DRAWINGS

The invention will be explained in more detail with the aid of several embodiments illustrated in the drawings. It is shown in.

DESCRIPTION OF PREFERRED EMBODIMENTS

Figure 1:
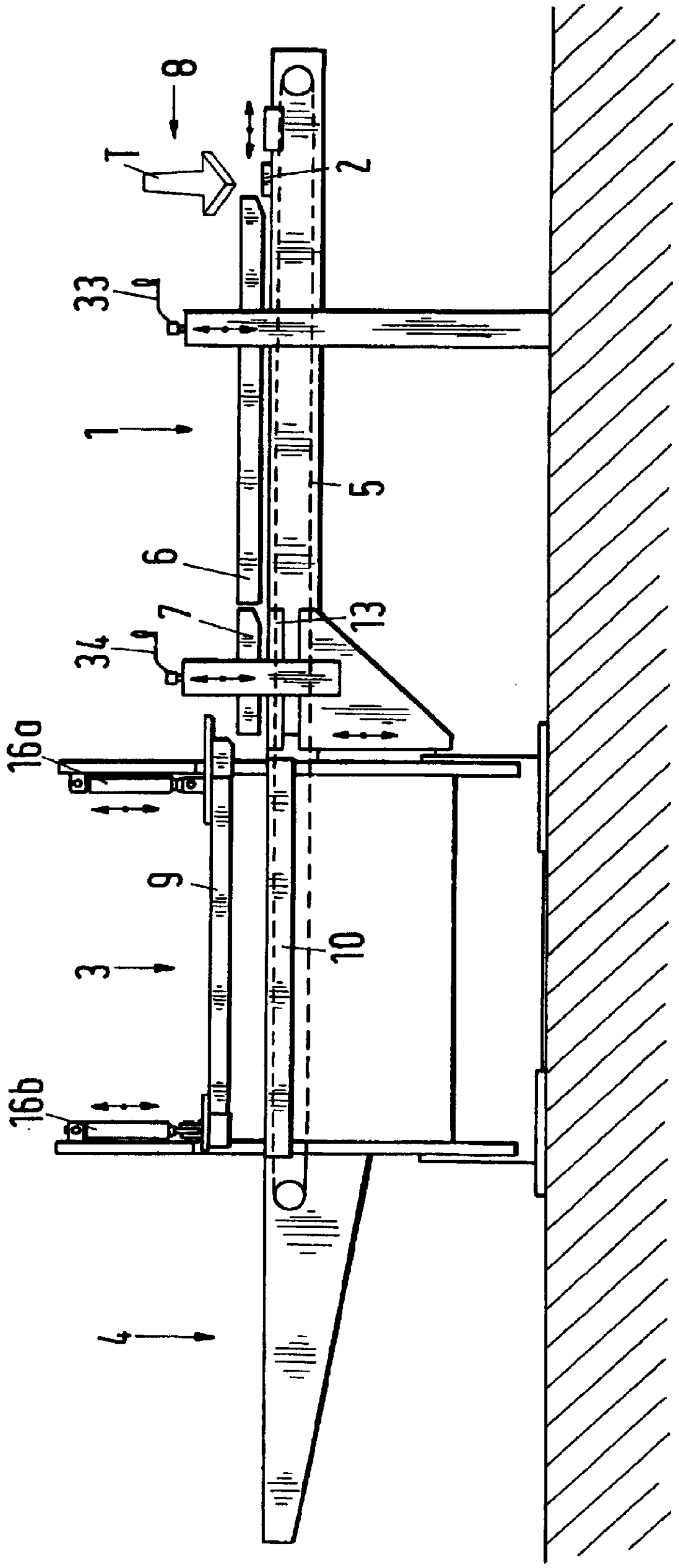
FIG. 1 in a side view and a schematic illustration a bonding machine for pieces of wood according to the invention.

By means of the bonding machine elongate work pieces of wood are bonded and pressed with one another with their longitudinal sides resting against one another. The bonding machine has a feeding device 1 with which the pieces of wood 2 (FIG. 2), resting with their longitudinal sides against one another, are fed to a pressing device 3. In it, the pieces of wood 2, resting with their longitudinal sides against one another and bonded at their longitudinal sides with one another, are pressed. The boards 12 produced of the pieces of wood then reach a support table 4 downstream of the pressing device 3.

The pieces of wood 2 are transported first in their longitudinal direction (arrow Tin FIG. 1) into the feeding device 1. For this purpose, a transport device (not illustrated) is provided which is preferably embodied as an endless circulating conveyor belt on which the pieces of wood 2 are transported individually and successively into the feeding device 1. During transport in the longitudinal direction an adhesive is applied with a coating device for adhesives (not illustrated) at least onto one longitudinal side, in a manner known in the art. In this way, the pieces of wood 2 are introduced successively into the feeding device 1 in which, as illustrated, for example, in FIG. 2, they rest with their longitudinal sides coated with the adhesive against one another.

In the advancing direction 1 the pieces of wood resting against one another are transported perpendicularly to their longitudinal direction. For this purpose, the feeding device 1 is provided with a transport device 5 which has several endless circulating transport belts 5 or transport chains with which the pieces of wood 2 are conveyed to the pressing device 3. In the feeding device 1, the pieces of wood 2 resting against one another are transported underneath two holding-down devices 6, 7 which are positioned at minimal spacing successively behind one another in the transport direction 8 of the pieces of wood 2 and can be adjusted with regard to their height for adjustment to pieces of wood of different thickness. In the direction transverse to the transport direction 8 of the pieces of wood 2, the holding-down devices 6, 7 can be comprised of adjacently positioned holding-down elements which can be height-adjusted independent from one another. However, it is also possible to configure the holding-down devices 6, 7 such that they extend almost across the entire length of the pieces of wood 2.

The pieces of wood 2 resting against one another are transported by the transporting device 5 also into the pressing device 3 in which the pieces of wood 2 are to be pressed in a way to be described in the following. The pressing device 3 has an upper clamping unit 9 and a lower pressing plate 10. After the pressing process, the pieces of wood can be moved by means of the transport device 5 onto the support table 4. Here the pieces of wood 2 bonded together to one or several boards 12 can be manually or automatically removed in a manner known in the art.

Figure 2:
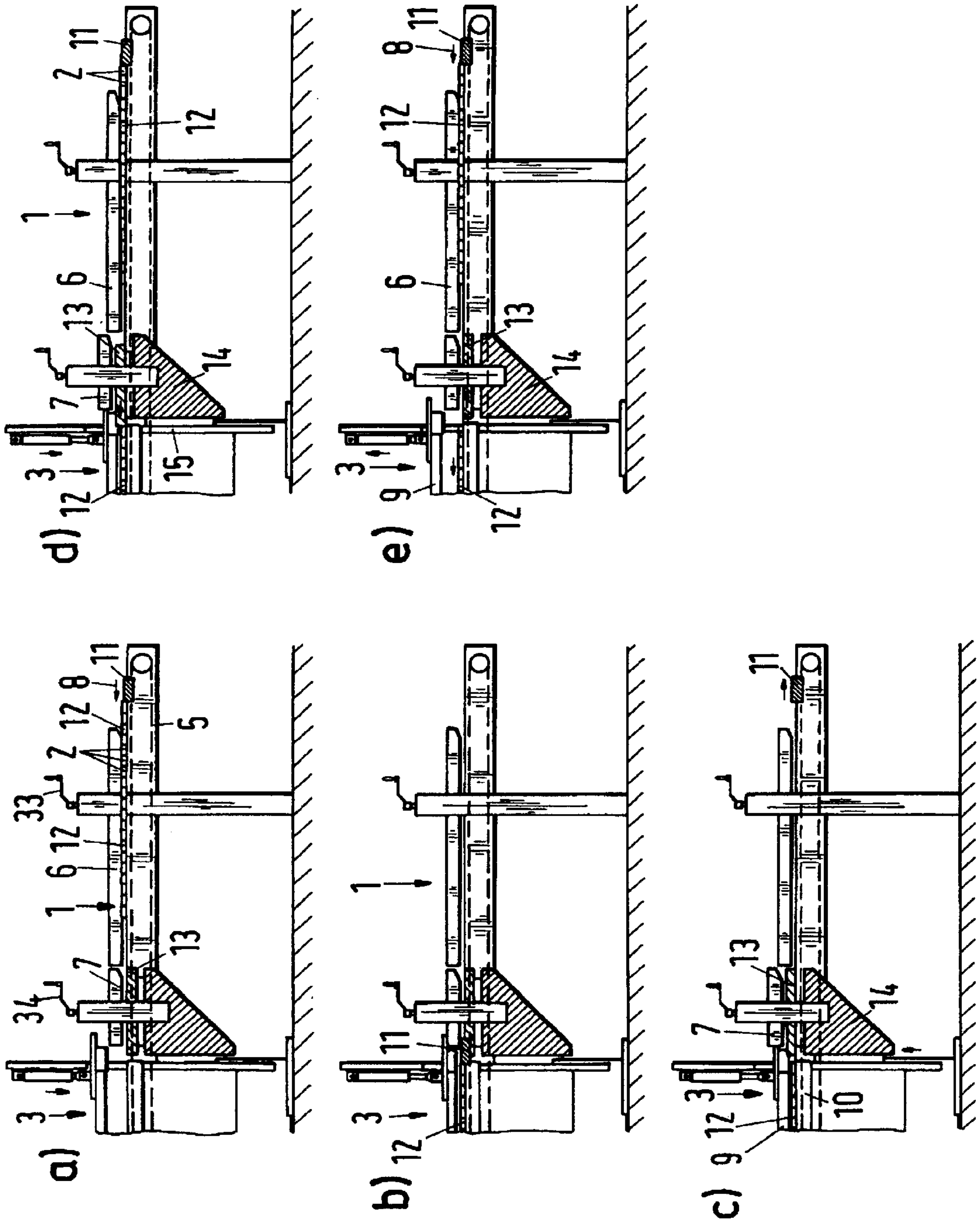
FIG. 2 in a schematic illustration the functions of the holding-down device of the bonding machine according to the invention.

FIG. 2 shows the process steps during transport of the pieces of wood 2 from the feeding device 1 into the pressing device 3. The transport device 5 is provided with at least one slide 11 which extends advantageously across the length of the pieces of wood 2. With it the pieces of wood 2 resting against one another are transported in the transport direction 8 under the holding-down devices 6, 7. They are adjusted such (FIG. 2*a*) that the pieces of wood 2 resting against one another and coated with adhesive can be transported underneath the holding-down members 6, 7. The required height adjustment of the holding-down devices 6, 7 can be performed manually by means of cranks 33, 34 or automatically.

The pieces of wood 2 resting against one another and coated with an adhesive form a board 12 which is pushed by the slide 11 underneath the holding-down devices 6, 7. They provide a pre-alignment of the pieces of wood 2 in front of the pressing device 3.

FIG. 2*b* shows the position when the slide 11 has pushed the package 12 completely into the pressing device 3. Now the transport direction of the transporting device 5 is switched so that the slide 11 returns into its initial position (FIG. 2*c*) in order to move the new board 12 to be formed within the feeding device 1 into the pressing device 3. The holding-down device 7 is now adjusted such in the direction of height that a pressing slide 13 coupled therewith reaches a position behind the board 12 positioned in the pressing device 3. During the feeding of the board 12 from the feeding device 1 into the pressing device 3, the pressing slide 13 is lowered to such an extent (FIG. 2*a* and FIG. 2*b*) that it serves as a support for the board 12 during feeding into the pressing device 3. In the lifted position (FIG. 2*c* and FIG. 2*d*) the pressing slide 13 exerts a pressing power in the transport direction 8 and is loaded in this connection by drives (not illustrated), in particular, cylinders, in order to press the board 12 positioned within the pressing device 3. The pressing process will be explained in detail in the following.

During the pressing process, the board 12 is heated. As soon as the heating period has expired, the pressing device 3 is relieved. The slide 13 moves into its most forward position in order to release the possibly adhering board 12. Subsequently, the slide 13 moves back into its initial position and is then lowered again into the position according to FIG. 2*a* so that it can serve as a table support for the subsequent board 12. When doing so, the holding-down device 7 also reaches again its initial position. The slide 11 is then advanced with the newly combined pieces of wood toward the pressing device 3. The board 12 already pressed is pushed out of the pressing device 3 onto the support table 4 by the new board 12.

The holding-down devices 6 and 7 are height-adjustable relative to the pressing slide 13 and the transport device 5 so that the holding-down device 7 can be adjusted property to the thickness of the pieces of wood 2, respectively, to the board 12 produced therefrom. The pressing slide 13 and the holding-down device 7 are supported on a lifting device 14 which in the illustrated embodiment has carriages which are movable along the guides 15 of the machine in the direction of height. The pressing slide 13 extends advantageously across the entire board width so that it can exert a uniform pressing force onto the board 12 in the pressing device 3. Accordingly, the pieces of wood 2 of the board 12 are reliably connected with one another.

In the described way the boards 12 to be pressed are guided through the machine in succession in a cycled fashion.

Figure 3:
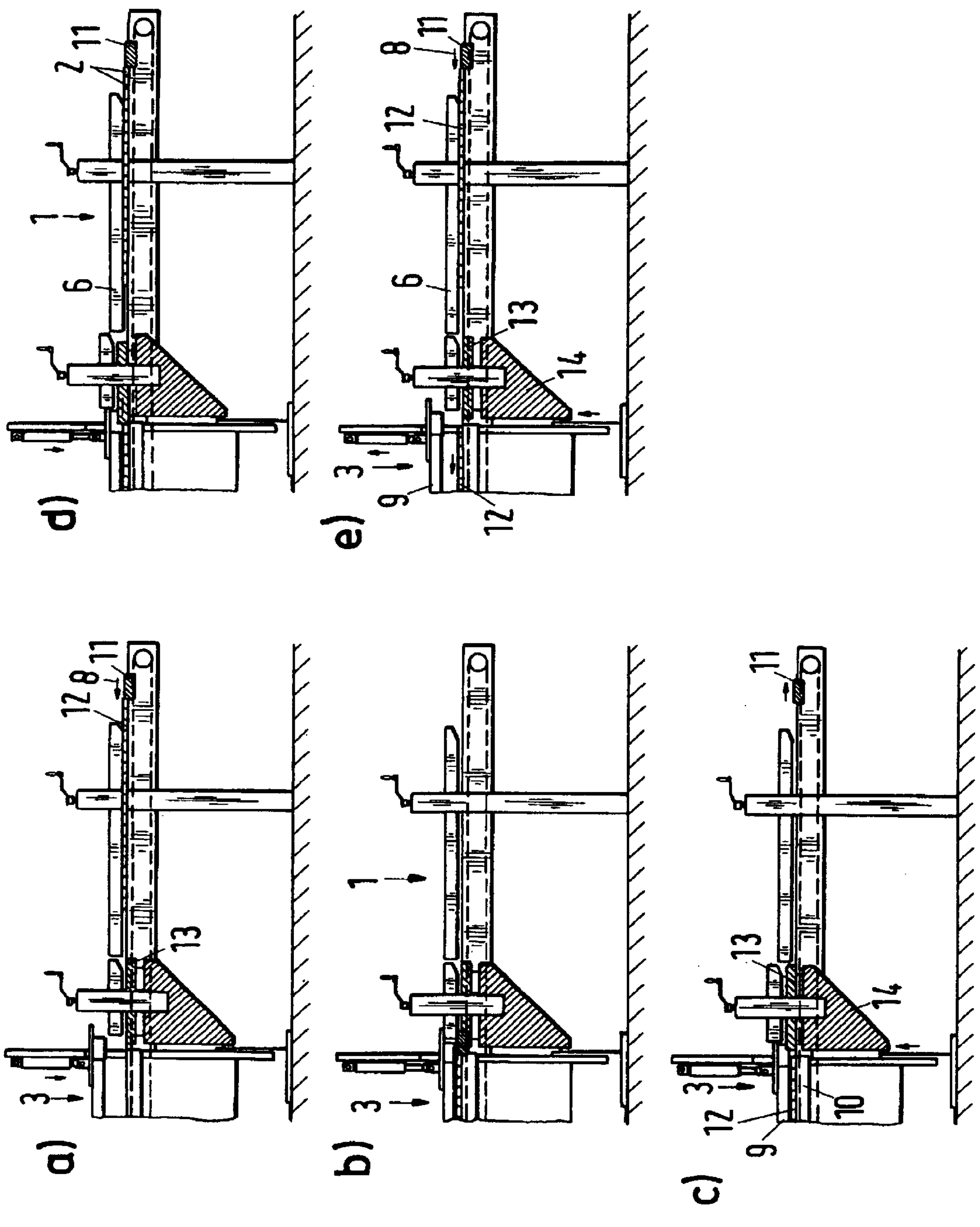
FIG. 3 in a schematic illustration different functions of two slides of the bonding machine according to the invention.
Figure 4:
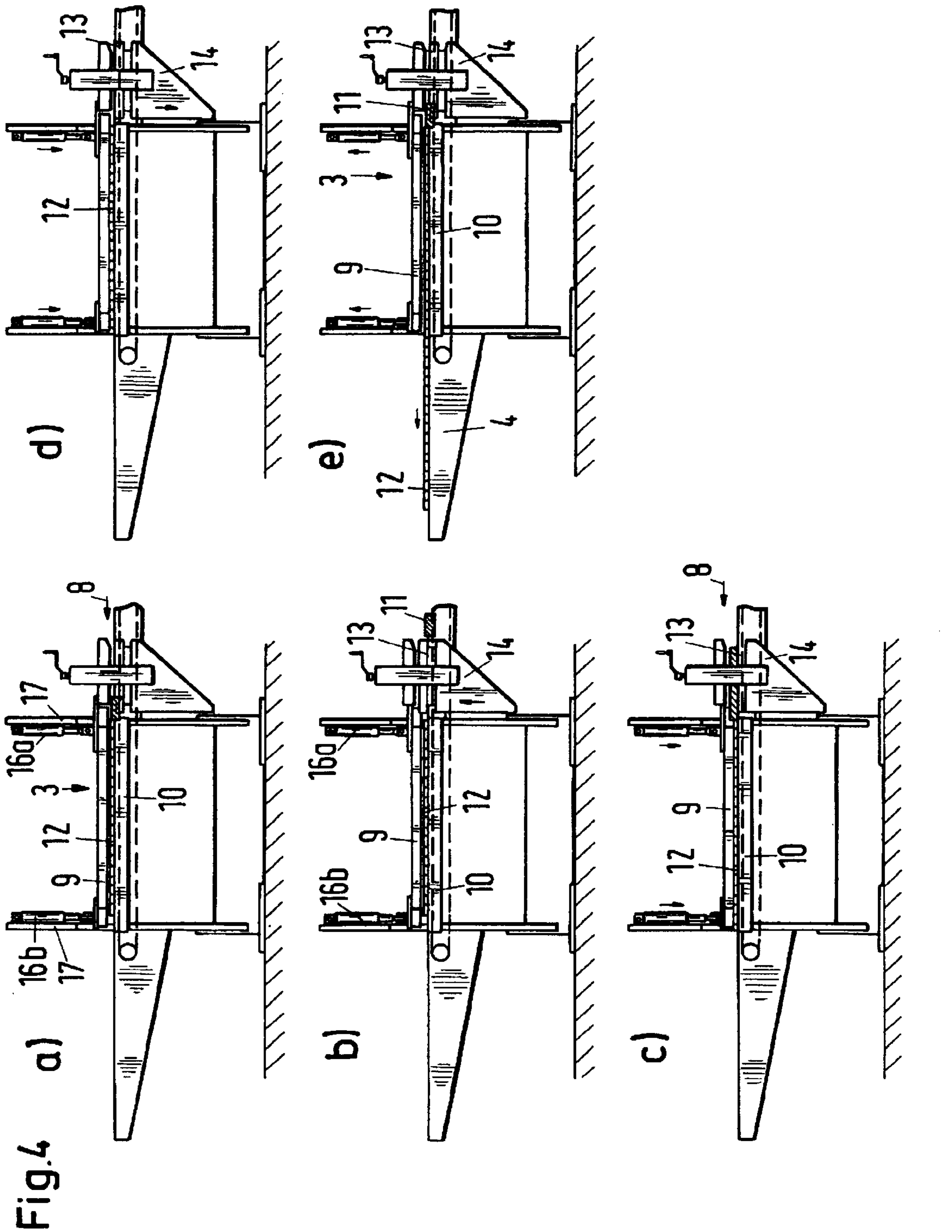
FIG. 4 the bonding machine according to the invention during the pressing action.

FIG. 3 shows the movement course of the pressing slide 13 during insertion of the package 12 into the pressing device 3. First, the pressing slide 13 is in the lower position (FIG. 3*a*) in which, in the described way, it serves as a table support during insertion of the board 12. With the slide 11 the board 12 is moved in the direction of arrow 8 out of the feeding device 1 into the pressing device 3 (FIG. 3*b*). It has an upper heating device 9 and lower heating device 10 arranged parallel thereto. The upper heating device 9 can also be height-adjusted by means of a drive 16*a*, 16*b*.

The drive 16*a*, 16*b* is formed by hydraulic or pneumatic cylinders which are provided on a frame 17 of the bonding machine. They are provided at the inlet and outlet areas of the pressing device 3. Several cylinders 16*a*, 16*b*, respectively, are provided at a spacing adjacent to one another across the width of the pressing device extending transversely to the feeding direction 8 of the boards 12.

When the board 12 with the slide 11 is moved between the two heating devices 9, 10, the heating device 9 is lifted by the cylinders 16*a*, 16*b* to such an extent that the board 12 can easily and with minimal counter force be moved into the pressing device 3. The previously pressed board 12 can then be simply pushed out with the new board to be pressed.

Before the slide 11 is returned again, the cylinders 16*a*, 16*b* are loaded with low pressure so that the heating device 9 rests substantially with its own weight on the board 12. This prevents that during return of the slide 11 pieces of wood of the board 12, which may be, for example, curved, could slide back.

As soon as the slide 11 has been returned, the pressing slide 13 with the carriage 14 is moved upwardly to such an extent that the pressing slide 13 will reach a position behind the package 12 positioned in the pressing device 3. The pressing slide 13 moves forwardly in the transport direction 8. The rear cylinders 16*a* in the transport direction 8 are relieved while the forward cylinders 16*b* in the transport direction 8 remain at low pressure. After a short stroke of the pressing slide 13 the cylinders 16*b* are switched to full pressure and now act as a brake during the pressing process. Pressing members 27 act in this connection onto the rear edge of the previously pressed board 12. This ensures that the pressing power can act on all the bonding joints of the new board 12. Also, the cylinders 16*a* to the rear acting as a holding-down device are loaded again with low pressure. The pressing slide 13 remains with the adjusted pressing power on the board 12 and presses the pieces of wood or lamellas of the board 12 against the brake force provided by the cylinders 16*b*. The individual lamellas are pressed tightly against one another and are therefore reliably bonded. During the pressing period, the pressing cylinders (not illustrated) which load the pressing slide 13, the brake cylinders 16*b*, and the holding-down cylinder 16*a* remain under pressure. While the pressing process in the pressing device 13 takes place, the subsequent pieces of wood 2 are already transported into the feeding device 1 and, upon entering the feeding device 1, are coated with an adhesive at one of their longitudinal sides (FIG. 3*d*). With the pieces of wood the next board 12 is formed which is then moved by the slide 11 underneath the holding-down device 6 up to a point of contact at the pressing slide 13. As soon as the pressing period has lapsed, the pressing slide 13 is lowered in the described way so that the new board 12 can be moved with the slide 11 across the pressing slide 13 into the pressing device 3 as described.

Figure 6:
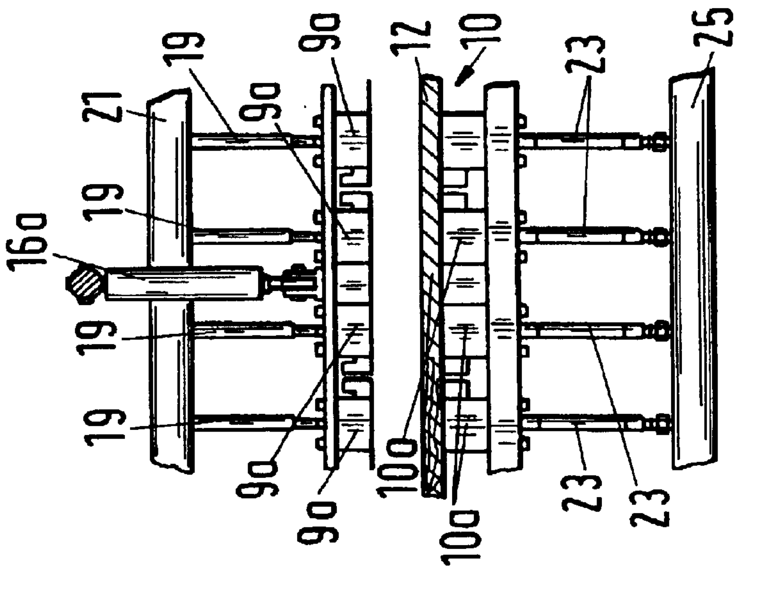
FIG. 6 a front view of the heating device according to FIG. 5.
Figure 7:
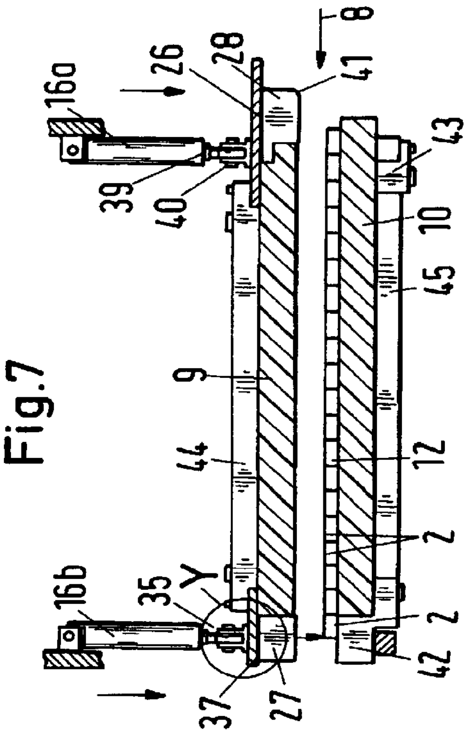
FIG. 7 and FIG. 8 in illustrations corresponding to FIGS. 5 and 6 a further embodiment of the heating device for the bonding machine according to the invention.
Figure 8:
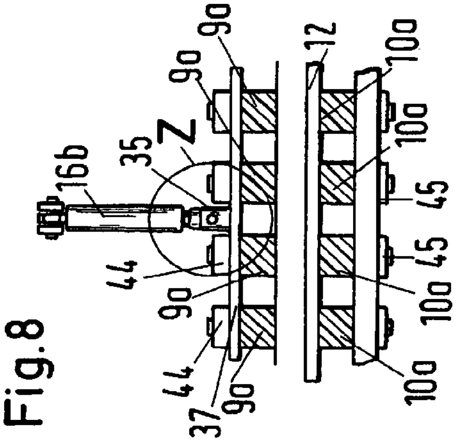
Figure 11Y:
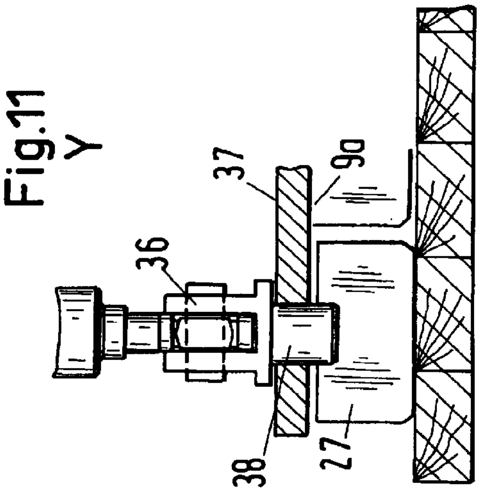
FIG. 11 in an enlarged illustration and in a side view a part of the pressing device of the bonding machine according to the invention.

The heating device 9 has individual heating tubes 9*a* (FIG. 6) which can be lifted and lowered in pairs by the cylinders 16*a*, 16*b*. The lower heating device 10 has also advantageously parallel extending heating tubes 10*a* which extend, like the heating tubes 9*a*, parallel to the feeding direction 8 and thus perpendicularly to the longitudinal direction of the pieces of wood 2 of the board 12. The heating tubes 10*a* are fastened at the forward and rearward ends in holders 42, 43 (FIG. 7). The heating tubes 9*a*, 10*a* are fastened with the upper and lower sides on the longitudinal supports 44, 45 (FIGS. 7 and 8).

Figure 5:
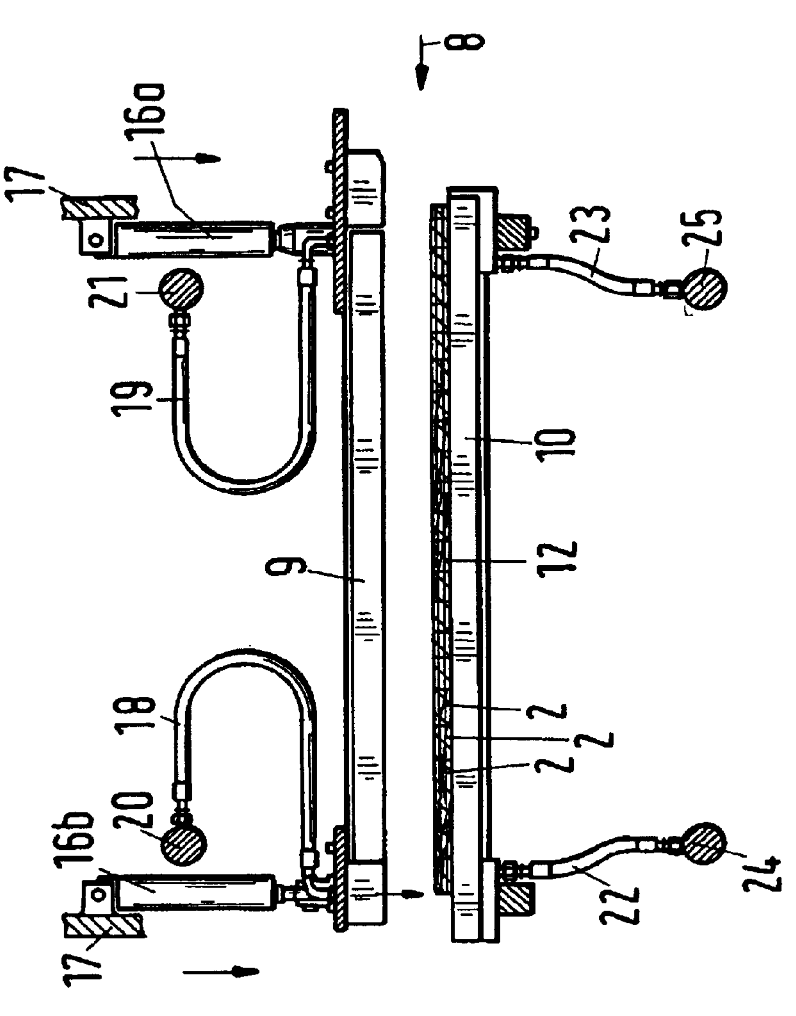
FIG. 5 in a side view a part of the heating device of the bonding machine according to the invention.

The board 12 during the pressing process is heated by means of the heating tubes 9*a*, 10*a*. A heating medium, for example, water, thermal oil and the like, is guided through the heating tubes. As illustrated in FIGS. 5 and 6, each heating tube 9*a* has at one end a supply line 18 and at the other end a return line 19 for the heating medium. All the supply lines 18 are connected to a common supply conduit 20 which is provided at a spacing above the heating device 9 and is secured in a suitable way at the bonding machine. Via the supply conduit 20 and the supply lines 18 connected thereto the heating medium is guided into the corresponding heating tube 9*a*. After flowing through the heating tubes 9*a*, the heating medium reaches the respective return line 19. The return lines 19 of the heating tubes 9*a* are connected to a common return conduit 21 via which the heating medium is returned. The supply conduit 20 and the return conduit 21 are positioned in the area between the cylinders 16*a*, 16*b* for the heating device 9. The return conduit 21 is also secured in a suitable way on the bonding machine.

Advantageously, the heating medium is circulated. It is possible to connect the supply conduit 20 and the return conduit 19 to the heating system of the installation facility of the bonding machine. However, it is also possible to provide the bonding machine with its own heating system.

In the same way as in the heating device 9, a heating medium also flows through the heating device 10. At one end of the heating tubes 10*a* a supply line 22 and at the other end a return line 23 for the heating medium are connected, respectively. All supply lines 22 and return lines 23 have correlated therewith a common supply conduit 24 and a common return conduit 25. These conduits 24, 25 can also be connected to the heating system of the installation facility of the bonding machine. However, it is also possible to connect these conduits 24, 25 to the own heating system of the bonding machine.

The heating tubes 9*a*, 10*a* have advantageously an angular cross-section. Accordingly, the heating tubes 9*a*, 10*a* rest during the pressing process areally on the board 12 so that an optimal heat transfer is ensured. Since the heating medium flows through the individual heating tubes 9*a*, 10*a*, no distortion by heat stress will occur during the pressing process. Moreover, soiling by exuding adhesive is less of a problem with full-surface area heating plates.

FIGS. 7 and 8 show an embodiment of the heating devices 9, 10 which are comprised of individual insulating elements 9*a*, 10*a* under which electrodes are arranged and which extend in the transport direction 8 and thus perpendicularly to the pieces of wood 2 of the board 12 to be pressed. They are connected to a high frequency source. The insulators 9*a*, 10*a* have a rectangular cross-section and are positioned at a spacing to one another (FIG. 8). In other respects, the pressing device operates identically to the previous embodiment. The heat is applied directly within the bonding joints via the insulators 9*a*, 10*a*.

It is also possible to generate the heat to be supplied during the pressing process in other ways, for example, by means of microwaves.

Figure 9:
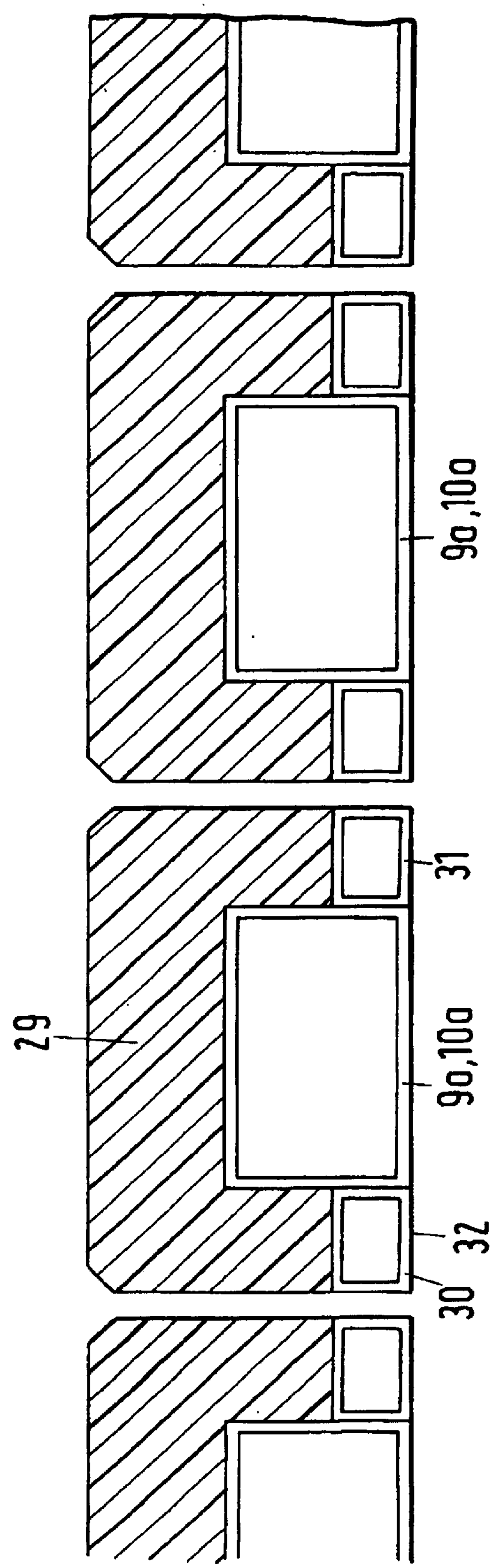
FIG. 9 in an enlarged illustration an insulation of heating tubes of the heating device of the bonding machine according to the invention.

FIG. 9 shows that the heating tubes 9*a*, 10*a* are surrounded over a portion of their periphery by an insulation 29 which is advantageously comprised of foamed polyurethane. The insulation 29 can, of course, be comprised also of any other suitable insulation material. Each individual heating tube 9*a*, 10*a* formed as a rectangular tube is surrounded at its side facing away from the board 12 to be pressed with an insulation 29 of a U-shaped cross section. At the end faces of the U-shaped insulations 29, rectangular tubes 30, 31 are provided which have a smaller rectangular cross-section and are positioned on both sides of the heating tubes 9*a*, 10*a* and adjoin with their facing narrow sides the narrow sides of these parts. The rectangular tubes 30, 31 as well as the heating tubes 9*a*, 10*a* have a common contact or support surface 32 with which they rests against the board 12 to be pressed. The insulation 29 can be applied simply and inexpensively.

For example, a cylinder 16*a*, 16*b* is provided for two neighboring heating tubes 9*a*, respectively. As is illustrated in FIGS. 7, 8, 10, and 11, the free end of the piston rod 35 of one of the cylinders 16*b* is received in a fork 36 which is arranged on a connecting plate 37. It extends transversely to the feeding direction 8 of the board 12 across the width of the heating device 9. At the underside of the connecting plate 37 the heating tubes or heating elements 9*a* extending perpendicularly to its longitudinal direction are fastened with their forward end in the feeding direction 8.

Figure 10Z:
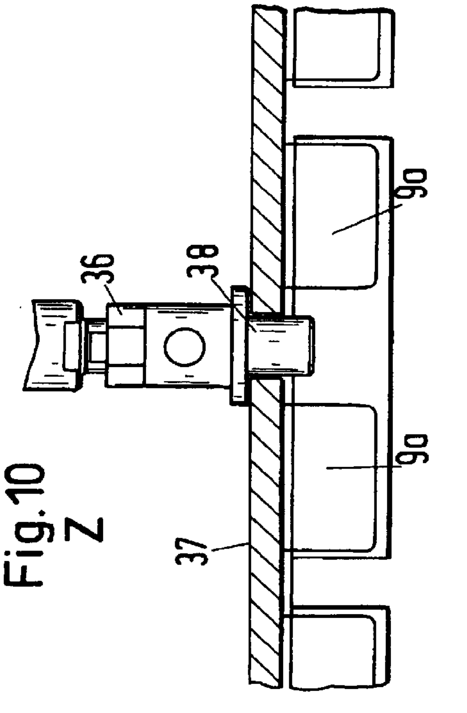
FIG. 10 in an enlarged illustration and in a front view pressing members of the bonding machine according to the invention.

The fork 36 projects with a projection 38 through the connecting plate 37 on which a pressing member 27 is fastened. It is positioned in the feeding direction 8 in front of the heating tubes 9*a* and extends perpendicularly thereto. As illustrated in FIG. 10, the pressure member 27 has such a width that, viewed in the longitudinal direction of the heating tubes 9*a*, two neighboring heating tubes are covered. In this way, the cylinders 16*b* are connected with one pressure member 27, respectively, behind which two heating tubes 9*a* are positioned, respectively. When the forks 36 rest on the connecting plate 37, the pressing members 27 have a spacing from its underside and project downwardly past the heating tubes 9*a*. The pressing members 27 can be moved by this spacing relative to the heating tubes 9*a*. Neighboring pressing members 27 are positioned with only minimal spacing adjacent to one another so that the brake pressure can be applied over the entire width of the board 12 during the pressing process in a reliable manner. The heating tubes 9*a*, since they are not directly connected with the cylinders 16*b*, rest with their own weight on the board 12.

The heating tubes or the heating elements 9*a* are fastened at the other end on a further connecting plate 26 (FIG. 7) which extends transversely to the heating tubes 9*a* across the width of the heating device 9. The piston rods 39 of the cylinders 16*a* are connected at the lower end, in correspondence to the piston rods 35, on forks 40 which are arranged above the connecting plate 26. In the feeding direction 8 in front of the heating tubes 9*a* noses 28 are provided which are positioned advantageously in front of each heating tube 9*a*. The noses 28 have an insertion slant 41 (FIG. 7) so that the board 12 to be pressed can be reliably inserted and pushed down in this way.

The noses 28 which are positioned in front of each heating tube ensure that the pieces of wood 2 of the board 12 are already well aligned during insertion into the pressing device.

Since several pressing members 27 are provided across the width of the board 12, which are driven independently from one another by the cylinders 16, 16*b*, the boards 12 which have pieces of wood 2 of different thickness are reliably pressed. The pressing slide 13 is provided with cutouts (not illustrated) into which the noses 28 can penetrate. This is required in particular in me processing of thin pieces of wood 2 because the pressing slide 13 is configured for the maximum pressing height.

In the production of bonded boards 12 it may occur that the pressing members 27 and noses 28 positioned at the forward and rearward ends in the transport direction 8 of the boards to be pressed are resting only partially on the board 12. When they are loaded during the pressing process in the described way, a moment of tilt occurs which is caused by them resting only partially on the board 12. In order to prevent this moment of tilt, it is advantageous to arrange under the corresponding pressing member or the corresponding nose a compensation element which is formed such that the pressing members 27 and the nose 28 are supported with their full surface area during the pressing process. The compensation elements are adjusted to the thickness of the board 12 and rests against it. In order for the compensation elements to be easily placed, the cylinders 16*a*, 16*b* of the pressing members 27 or the noses 28 are relieved so that the respective compensation elements can be pushed underneath easily. In order to realize this relief easily, the corresponding cylinder 16*a*, 16*b* has a shut-off and relief valve so that by actuating this valve the cylinders 16*a*, 16*b* can be simply relieved.

The bonding machine is advantageously of a modular design so that it is easily adjusted to different bonding width (length of pieces of wood). The pressures required for pressing are adjusted manually for a standard machine by pressure regulators according to a diagram. In an upgraded embodiment the pressure adjustment is advantageously provided by a control unit. During the pressing process the adjusted heating time is realized with or without high frequency. In this connection, the pressing slide 13 controls and regulates automatically the pressing power of the bonding action.

What is claimed is:

1. Bonding machine for lamellar pieces of wood to be joined to a board, wherein the bonding machine comprises:

at least one clamping and pressing device and at least one drive;

wherein the at least one clamping and pressing device has at least two pressing members which are configured to be loaded independently of one another against the board by a pressure force;

wherein the at least one clamping and pressing device comprises a pressing slide that applies a pressing force onto the pieces of wood, arranged in a common plane and having longitudinal sides resting against one another, in a direction transverse to the longitudinal sides resting against one another for forming the board;

wherein the at least two pressing members generate a brake force acting perpendicularly onto a face of the board in a direction perpendicular to the pressing force of the pressing slide.

2. Bonding machine according to claim 1, wherein the at least two pressing members extend parallel to the pieces of wood and transversely to a feeding direction of the board.

3. Bonding machine according to claim 1, wherein the at least one drive comprises piston-cylinder units configured to adjust the at least two pressing members.

4. Bonding machine according to claim 1, wherein the at least one clamping and pressing device has heating elements and the at least two pressing members are movable in a direction transversely to the board relative to the heating elements to a limited extent.

5. Bonding machine according to claim 4, wherein the heating elements are tubes configured to have a heating medium circulate therethrough.

6. Bonding machine according to claim 5, wherein the heating medium is water, thermal oil, or steam.

7. Bonding machine according to claim 5, wherein the clamping and pressing device has one or more supply lines and one ore more return lines for the heating medium connected to the heating elements.

8. Bonding machine according to claim 7, wherein the supply lines of the heating elements comprise a common supply conduit and the return lines of the heating elements comprise a common return conduit.

9. Bonding machine according to claim 5, wherein the heating elements are partially enclosed by an insulation.

10. Bonding machine according to claim 4, wherein the heating elements are electrodes.

11. Bonding machine according to claim 4, wherein the heating elements extend parallel to one another.

12. Bonding machine according to claim 4, wherein the heating elements extend in the feeding direction of the board.

13. Bonding machine according to claim 4, further comprising a common support, wherein the heating elements are fastened to the common support.

14. Bonding machine according to claim 13, wherein the at least one drive comprises piston-cylinder units configured to adjust the at least two pressing members, further comprising coupling members connected to the piston-cylinder units, wherein the support has through openings configured to receive the coupling members.

15. Bonding machine according to claim 14, wherein the coupling members, positioned at an outlet side of the pressing device, connect the piston-cylinder units and the at least two pressing members.

16. Bonding machine according to claim 15, wherein one of the coupling members is movable to a limited extent relative to the support in which the one coupling member is received and to the heating elements in a direction transversely to the plane of the board.

17. Bonding machine according to claim 15, wherein the at least two pressing members extend across the area of at least two adjacently positioned heating elements.

18. Bonding machine according to claim 15, wherein the at least two pressing members are positioned at the outlet side of the pressing device in front of the heating elements.

19. Bonding machine according to claim 4, further comprising a support, wherein the heating elements are fastened to the support and are configured for receive tensile forces in the feeding direction.

20. Bonding machine according to claim 1, wherein the pressing device has a support for the board.

21. Bonding machine according to claim 20, wherein the support is comprised of at least two support parts.

22. Bonding machine according to claim 21, wherein the at least two support parts are heating members.

23. Bonding machine according to claim 22, wherein the support parts are formed as tubes through which the heating medium is circulated.

24. Bonding machine according to claim 23, comprising one or more supply lines and one or more return lines for the heating medium connected to the support parts.

25. Bonding machine according to claim 24, wherein the supply lines comprise a common supply conduit and the return lines comprise a common return conduit.

26. Bonding machine according to claim 21, wherein the support parts are partially enclosed by an insulation.

27. Bonding machine according to claim 21, wherein the at least two support parts are electrodes which extend transversely to the pieces of wood of the board.

28. Bonding machine according to claim 1, wherein the at least one clamping and pressing device has lower heating elements fastened on a frame of the at least one clamping and pressing device and configured to receive tensile forces in the feeding direction.

29. Bonding machine for lamellar pieces of wood to be joined to a board, wherein the bonding machine comprises at least one clamping and pressing device and at least one drive, wherein the at least one clamping and pressing device has at least two pressing members which are configured to be loaded independently of one another against the board by a pressure force;

wherein the at least one clamping and pressing device comprises a pressing slide that applies a pressing force onto the pieces of wood, arranged in a common plane and having longitudinal sides resting against one another, in a direction transverse to the longitudinal sides resting against one another for forming the board;

wherein the at least two pressing members generate a brake force acting perpendicularly onto a face of the board in a direction perpendicular to the pressing force of the pressing slide;

wherein the at least one clamping and pressing device has heating elements and the at least two pressing members are movable in a direction transversely to the board relative to the heating elements to a limited extent;

a common support, wherein the heating elements are fastened to the common support; and wherein the support is comprised of two connecting plates which extend transversely to the feeding direction of the board and ends of the heating elements are fastened to the two connecting plates.

30. Bonding machine for lamellar pieces of wood to be joined to a board, wherein the bonding machine comprises at least one clamping and pressing device and at least one drive, wherein the at least one clamping and pressing device has at least two pressing members which are configured to be loaded independently of one another against the board by a pressure force;

wherein the at least one clamping and pressing device has heating elements and the at least two pressing members are movable in a direction transversely to the board relative to the heating elements to a limited extent;

a support, wherein the heating elements are fastened to the support and are configured for receive tensile forces in the feeding direction;

noses connected to the support and positioned in front of each heating element at the inlet side of the at least one clamping and pressing device.

31. Bonding machine for lamellar pieces of wood to be joined to a board, wherein the bonding machine comprises at least one clamping and pressing device and at least one drive, wherein the at least one clamping and pressing device has at least two pressing members which are configured to be loaded independently of one another against the board by a pressure force;

wherein the at least one clamping and pressing device has at least one pressing slide configured to apply the pressing force onto the pieces of wood of the board.

32. Bonding machine according to claim 31, comprising a lifting device configured to adjust the pressing slide from a lowered position into a working position.

33. Bonding machine according to claim 32, wherein the pressing slide in the lowered position forms a support for the pieces of wood during insertion into the at least one clamping and pressing device.

34. Bonding machine according to claim 31, further comprising a support, wherein the heating elements are fastened to the support and further comprising noses connected to the support and positioned in front of each heating element at the inlet side of the at least one clamping and pressing device, wherein the pressing slide has cutouts into which the noses penetrate.

35. Bonding machine according to claim 31, wherein the lifting device has at least one height-adjustable carriage on which the pressing slide is arranged.

36. Bonding machine according to claim 35, wherein the pressing slide is configured to move transversely to a movement direction of the at least one carriage and absolutely parallel and configured to apply the pressure force onto the pieces of wood.

37. Bonding machine according to claim 35, wherein the pressing slide extends across the length of the pieces of wood of the board.

38. Bonding machine according to claim 35, comprising a feeding device arranged upstream of the at least one clamping and pressing device, wherein the pieces of wood are combined to the board in the feeding device.

39. Bonding machine according to claim 38, wherein the feeding device has at least one holding-down device for the pieces of wood of the board.

40. Bonding machine according to claim 39, wherein the at least one holding-down device is adjustable in the direction of height.

41. Bonding machine according to claim 40, wherein the at least one holding-down device has at least two holding-down elements arranged successively in the feeding direction of the pieces of wood.

42. Bonding machine according to claim 41, wherein the at least two holding-down elements are height-adjustable independent from one another.

43. Bonding machine according to claim 41, wherein a forwardly positioned one of the at least two holding-down elements in the feeding direction of the pieces of wood is height-adjustable together with the at least one carriage.

44. Bonding machine according to claim 41, wherein a forwardly positioned one of the at least two holding-down elements in the feeding direction of the pieces of wood is height-adjustable relative to the pressing slide and to the at least one carriage.

45. Bonding machine according to claim 38, wherein the feeding device has at least one slide configured to act on the board.

46. Bonding machine according to claim 45, wherein a pressure bed is positioned on the bonded board which, upon insertion of a new board, forms a friction element against the force of the slide.

47. Bonding machine according to claim 38, further comprising a coating station for en adhesive arranged upstream of the feeding device and configured to coat at least one of the longitudinal sides of the pieces of wood with an adhesive.

48. Bonding machine according to claim 47, wherein the at least one longitudinal side of the pieces of wood are coated during transport into the feeding device.

* * * * *